United States Patent
Fujimaki

(10) Patent No.: US 7,703,904 B2
(45) Date of Patent: Apr. 27, 2010

(54) PRINTING APPARATUS AND CONTROL METHOD OF PRINTING APPARATUS

(75) Inventor: Atsushi Fujimaki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 303 days.

(21) Appl. No.: 11/590,861

(22) Filed: Nov. 1, 2006

(65) Prior Publication Data

US 2007/0103536 A1 May 10, 2007

(30) Foreign Application Priority Data

Nov. 1, 2005 (JP) .......................... P2005-318147

(51) Int. Cl.
*B41J 2/175* (2006.01)
(52) U.S. Cl. .............................. 347/86; 347/7; 347/106
(58) Field of Classification Search ...................... 347/7, 347/86, 106, 5, 9, 19
See application file for complete search history.

(56) References Cited

U.S. PATENT DOCUMENTS

| 6,672,695 | B1 * | 1/2004 | Naka et al. ...................... 347/7 |
| 7,182,445 | B2 * | 2/2007 | Johnson et al. ............... 347/86 |

FOREIGN PATENT DOCUMENTS

| JP | 2001-347706 A | 12/2001 |
| JP | 2003-39765 A | 2/2003 |
| JP | 2004-240944 A | 8/2004 |
| JP | 2004-303194 A | 10/2004 |
| JP | 2005-115926 A | 4/2005 |

* cited by examiner

*Primary Examiner*—Lam S Nguyen
(74) *Attorney, Agent, or Firm*—Sughrue Mion, PLLC

(57) ABSTRACT

A printing apparatus includes: a recording medium interface that sets a recording medium having a predetermined specification; a printing data interface that receives printing data; a printer that performs printing; a non-volatile storage that stores a password, and usage/non-usage designating information indicating whether or not the recording medium interface is used; a usage/non-usage information changing portion that executes a process for changing the usage/non-usage information stored in the non-volatile storage according to an instruction by an operator, only when the operator inputs the password stored in the non-volatile storage; and a controller that executes a direct printing process for reading out information from the recording medium set in the recording medium interface and allowing contents indicated by the information to be printed by the printer, and a common printing process for allowing contents indicated by the printing data received by the printing data interface to be printed by the printer, wherein, when the usage/non-usage information stored in the non-volatile storage is information indicating that the recording medium interface is not used, the controller operates in a state where the controller does not execute a process that access the recording medium interface at all.

3 Claims, 8 Drawing Sheets

FIG. 5

| MENU NAME | TYPE INFORMATION |
|---|---|
| PRINTER INFORMATION | EXECUTION TYPE |
| INDEX PRINTING | - |
| DOCUMENT FILE PRINTING | - |
| IMAGE FILE PRINTING | - |
| ⋮ | ⋮ |
| PAPER FEEDING DEVICE SETTING | COMMON SETTING |
| PRINTER SETTING | COMMON SETTING |
| PRINTER RESET | EXECUTION TYPE |
| ⋮ | ⋮ |
| PARALLEL I/F SETTING | I/F SETTING |
| USB I/F SETTING | I/F SETTING |
| NETWORK SETTING | I/F SETTING |
| USB HOST SETTING | I/F SETTING |
| ⋮ | ⋮ |
| PASSWORD SETTING | PASSWORD |
| ⋮ | ⋮ |

FIG. 6 (A)

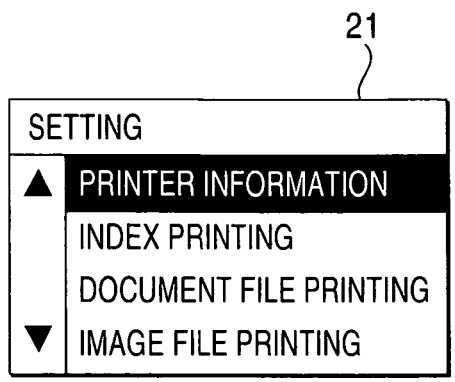

FIG. 6 (B)

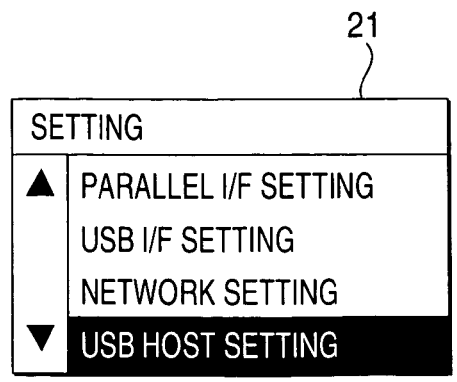

FIG. 7 (A1)

NETWORK SETTING
- NETWORK I/F = USE
- IP ADDRESS SETTING
- IP = 192.168.192.168
- SM = 255.255.255.0

FIG. 7 (A2)

USB HOST SETTING
- USB HOST = USE

FIG. 7 (B)

PAPER FEEDING DEVICE SETTING
- MP TRAY SIZE = A4
- CASSETTE SIZE = A4
- MP TRAY TYPE = COMMON PAPER
- CASSETTE TYPE = COMMON PAPER

FIG. 7 (C)

PRINTER RESET
- WARNING CLEAR
- ALL WARNING CLEAR
- RESET
- RESET ALL

FIG. 7 (D)

PASSWORD SETTING
- PASSWORD SETTING
- AUTHENTICATION LEVEL = ALL ITEM

FIG. 8

| AUTHENTICATION LEVEL \ TYPE INFORMATION | EXECUTION TYPE | COMMON SETTING | I/F SETTING | PASSWORD |
|---|---|---|---|---|
| ALL ITEMS | AUTHENTICATION IS NECESSARY | AUTHENTICATION IS NECESSARY | AUTHENTICATION IS NECESSARY | AUTHENTICATION IS NECESSARY |
| ONLY SETTING ITEM | AUTHENTICATION IS UNNECESSARY | AUTHENTICATION IS NECESSARY | AUTHENTICATION IS NECESSARY | AUTHENTICATION IS NECESSARY |
| ONLY I/F SETTING ITEM | AUTHENTICATION IS UNNECESSARY | AUTHENTICATION IS UNNECESSARY | AUTHENTICATION IS NECESSARY | AUTHENTICATION IS NECESSARY |
| NOT AUTHENTICATED | AUTHENTICATION IS UNNECESSARY | AUTHENTICATION IS UNNECESSARY | AUTHENTICATION IS UNNECESSARY | AUTHENTICATION IS UNNECESSARY |

FIG. 9

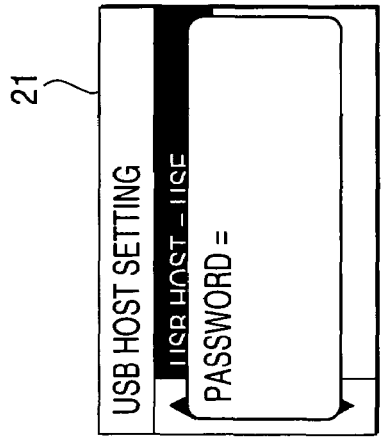

USB HOST SETTING
USB HOST = USE
PASSWORD =

PRINTING APPARATUS AND CONTROL METHOD OF PRINTING APPARATUS

BACKGROUND

1. Technical Field

The present invention relates to a printing apparatus that has a function of reading information (file) stored in a memory card or the like and printing it.

2. Related Art

Recently, among printing apparatuses (printers and complex machines) that are on the market, there are printing apparatuses which have a function of reading an image file stored on a recording medium (a memory card, a USB memory, or the like) and printing it.

An existing printing apparatus that has the above-described function (hereinafter, referred to as direct printing function) prints a file selected by a user on a recording medium set therein, when the file is in a printable format. That is, the existing printing apparatus that has the direct printing function can perform a 'function of allowing a computer to manage a usage situation of the printing apparatus for charging', and a 'function of allowing a computer (print server) to restrict the usage of the printing apparatus for security reasons (preventing information from leaking out)'.

SUMMARY

An advantage of some aspects of the invention is to provide a printing apparatus that has a direct printing function and can be used even in an environment where charging for printing is made, or an environment where printing is restricted for security reasons.

The advantage can be attained as at least one of the following aspects:

According to an aspect of the invention, a printing apparatus includes a recording medium interface that sets a recording medium having a predetermined specification; a printing data interface that receives printing data; a printer that performs printing; a non-volatile storage that stores a password, and usage/non-usage designating information indicating whether or not the recording medium interface is used; a usage/non-usage information changing portion that executes a process for changing the usage/non-usage information stored in the non-volatile storage according to an instruction by an operator, only when the operator inputs the password stored in the non-volatile storage; and a controller that executes a direct printing process for reading out information from the recording medium set in the recording medium interface and allowing contents indicated by the information to be printed by the printer, and a common printing process for allowing contents indicated by the printing data received by the printing data interface to be printed by the printer, wherein, when the usage/non-usage information stored in the non-volatile storage is information indicating that the recording medium interface is not used, the controller operates in a state where the controller does not execute a process that access the recording medium interface at all.

That is, the printing apparatus according to the aspect of the invention has a structure that can operate in an operation mode in which the direct printing function can be used, and an operation mode in which the direct printing function cannot be used. Further, the printing apparatus has a structure in which only people who know the password can change an operation mode. Accordingly, even though the printing apparatus has the direct printing function, the printing apparatus can be used even in an environment where charging for printing is made, or an environment where printing is restricted for security reasons.

As the controller of the printing apparatus according to the aspect of the invention, the controller may include a CPU, a RAM, and a ROM. It is possible to adopt a controller constructed such that an interface control program is always loaded in the RAM for controlling a recording medium interface. However, in a printing apparatus that has adopted a controller having this structure, a storage region of a RAM may be insufficiently used, when a direct printing function is not used. For this reason, in the printing apparatus of the invention, the controller may include a CPU, a RAM, and a ROM and the ROM may store an interface control program for controlling the recording medium interface, and a main program that allows the CPU that starts to operate according to its program to load the interface control program on the RAM when the usage/non-usage designating information stored in the non-volatile storage is information indicating that the recording medium interface is used.

In the aspect of the invention, the recording medium interface may be a USB host.

Another aspect of the invention provides a control method of a printing apparatus that can selectively excuse a first operation mode in which a direct printing can be used and a second operation mode in which a the direct printing cannot be used, the method comprising: detecting which one of the first and second operation modes is set; and executing a printing operation in the second mode without allowing a CPU to load a program for the first operation mode on a RAM when the second operation mode is set.

In the aspect of the invention, when the first operation mode is set, the printing operation may be executed in the first operation mode based on the program for the first operation mode loaded on the RAM.

In the aspect of the invention, the method may further comprise: authenticating a password input by the user for changing the operation mode.

In the aspect of the invention, when the password is not authenticated, an error message may be displayed.

In the aspect of the invention, when the password is authenticated, the operation mode may be changed.

In the aspect of the invention, when the first operation mode is changed to the second operation mode, the program for the first operation mode laded on the RAM is unloaded.

In the aspect of the invention, a menu screen including a menu for the first operation mode may be displayed.

In the aspect of the invention, when the menu for the first operation mode is selected, the detecting step may be executed.

In the aspect of the invention, when the menu for the first operation mode is selected while the first operation mode is not set, an error message may be displayed.

In the aspect of the invention, when the menu for the first operation mode is selected while the first operation mode is set, the printing operation may be executed in the first operation mode.

The present disclosure relates to the subject matter contained in Japanese patent application No. 2005-318147 filed on Nov. 1, 2005, which is expressly incorporated herein by reference in its entirety.

BRIEF DESCRIPTION OF THE DRAWINGS

FIG. 5 is a diagram illustrating menu screen information used in a process of FIG. 4.

FIG. 6 is a diagram illustrating a menu screen displayed on a LCD of an operation panel.

FIG. 7 is a diagram illustrating a process item screen displayed on a LCD of an operation panel.

FIG. 8 is a diagram illustrating a determining algorithm used in an authentication necessity determining process.

FIG. 9 is a diagram illustrating a state of a LCD in a password acquiring process.

DESCRIPTION OF EXEMPLARY EMBODIMENTS

Preferred embodiments of the invention will now be described in detail with reference to the accompanying drawings.

First, a hardware structure of a printing apparatus 10 according to an embodiment of the invention will be described with reference to FIGS. 1 to 3.

Figure 1:
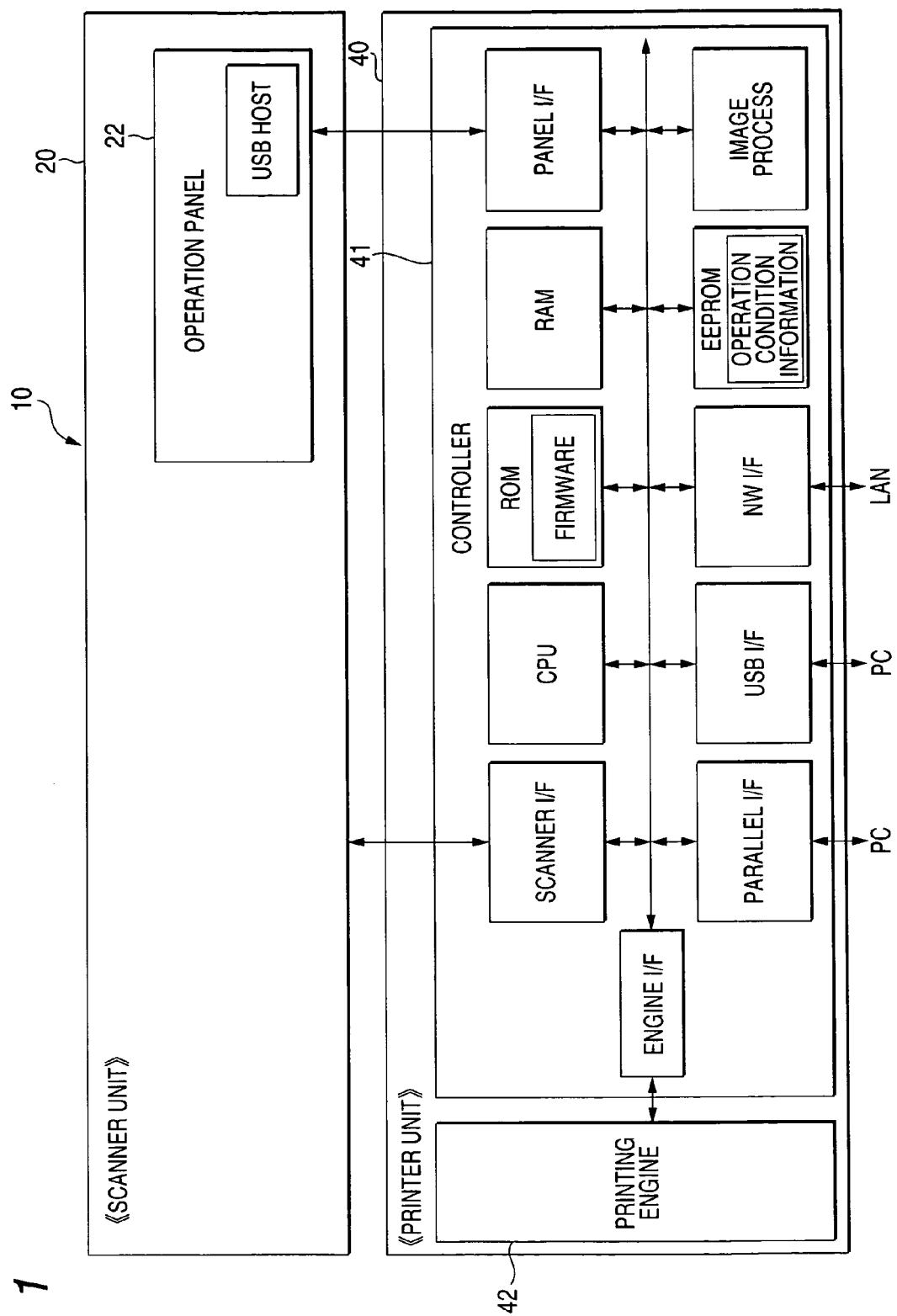
FIG. 1 is diagram illustrating a structure of a printing apparatus according to an embodiment of the invention.
Figure 3:
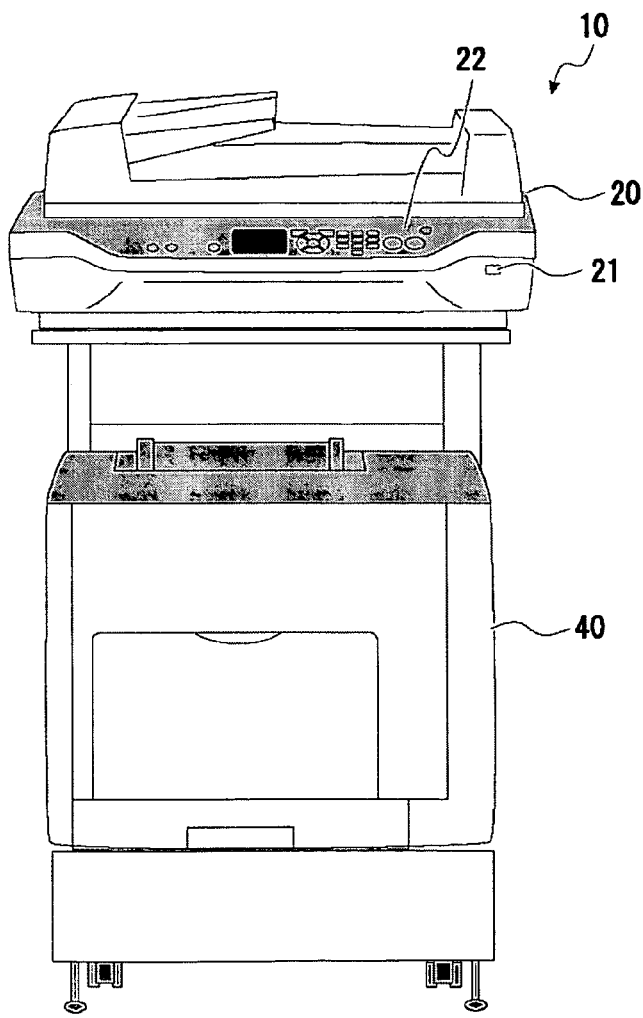
FIG. 3 is a diagram illustrating an outer appearance of a printing apparatus according to an embodiment of the invention.

As shown in FIGS. 1 and 3, the printing apparatus 10 according to the embodiment of the invention is an apparatus (complex machine) that includes a scanner unit 20 having an operation panel 22, and a printer unit 40.

Figure 2:
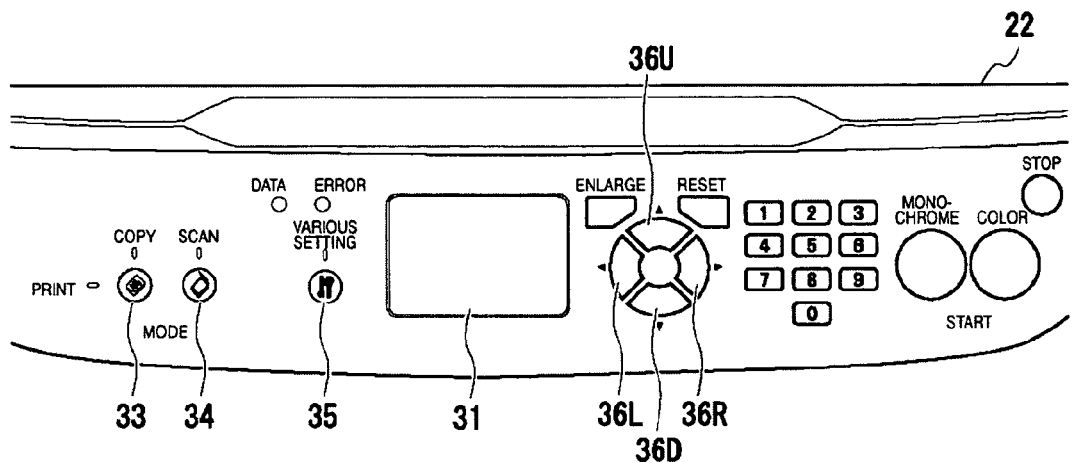
FIG. 2 is a diagram illustrating an operation panel that is included in a printing apparatus according to an embodiment of the invention.

As shown in FIGS. 1 and 2, the operation panel 22 that is included in the printing apparatus 10 is a unit that includes a USB host circuit (interface circuit for accessing a USB memory; in FIG. 1, 'USB host'), an LCD 31, a copy button 33, a scan button 34, a various setting button 35, a leftward button 36L, a rightward button 36R, an upward button 36U, a downward button 36D, and the like. Further, the operation panel 22 (scanner unit 20) is a unit in which an inserting slot 21 of the USB memory (a portion of the USB host circuit) is provided at a location shown in FIG. 3.

The printer unit 40 (see FIG. 1) includes a controller 41 and a printing engine 42.

The printing engine 42 that is included in the printer unit 40 performs printing on paper.

The controller 41 controls all of the respective units provided in the printing apparatus 10. As shown in the drawings, the controller 41 includes an engine interface circuit ('engine I/F'), a scanner interface circuit ('scanner I/F'), a CPU, a ROM that stores firmware, a RAM, a panel interface circuit ('panel I/F'), a parallel interface circuit ('parallel I/F'), a USB interface circuit ('USB I/F'), a network interface circuit ('NW I/F'), an EEPROM that stores operation condition information, and an image processing circuit ('image process').

On the basis of the above-described description, the structure and the operation of the printing apparatus 10 according to the embodiment of the invention will now be described in detail.

Generally, the printing apparatus 10 according to this embodiment operates as a printer. If a copy button 33 (see FIG. 2) is pressed, the printing apparatus 10 starts to function as a copy machine. Further, if a scanner button 34 is pressed, the printing apparatus 10 starts to function as a push scan apparatus, and if a various setting button 35 is pressed, the printing apparatus 10 starts to operate in a state (which will be described in detail below) where a variety of printing is generated from files stored in a USB memory inserted into the inserting slot 21. Further, the push scan apparatus refers to an apparatus that has a function of creating an image data file on a document set in the scanner unit 20 and storing it in a PC designated by a user or on the USB memory inserted into the inserting slot 21.

Furthermore, the printing apparatus 10 is an apparatus that can be operated in a state in which at the time of pressing the copy button 33 or the scan button 34, input of a user's password is required (apparatus having a function of managing the number of copied sheets designated by each user). The printing apparatus 10 becomes an apparatus having a job information managing function. In this case, the job information managing function includes a function of storing job information, such as a name of a computer and a user' name from a PC that corresponds to a transmitting source of the printing job data on which printing is performed, the number of copied sheets, and the like, and a function of transmitting job information stored in a PC that has transmitted a predetermined command.

The operation condition information that is stored in the EEPROM of the controller 41 (see FIG. 1) is information that designates various operation conditions of the printing apparatus 10.

The operation condition information includes USB host usage/non-usage designating information indicating whether or not to use the USB host circuit, parallel interface usage/non-usage designating information indicating whether or not to use the parallel interface circuit, USB interface usage/non-usage designating information indicating whether or not to use the USB interface circuit, network interface usage/non-usage designating information indicating whether or not to use a network interface circuit, various information (IP address or the like) indicating whether or not to designate operation conditions of the respective interface circuits, an authentication level (information indicating any one of 'all items', 'only setting items', 'only I/F setting items', and 'not authenticated'; which will be described in detail below), and a manager password (hereinafter, simply referred to as 'password').

The firmware that is stored in the ROM of the controller 41 includes a main program, a program for controlling each interface circuit (that is, so-called driver), and the like. Further, the main program that is included in the firmware is a program that allows, when power is supplied, the controller 41 (CPU) having starting an operation on the basis of the main program to execute a process, which checks a value of usage/non-usage designating information in respects to each interface circuit among the above-described operation conditions and loads a program in respects to each interface circuit designated to be used on the RAM.

Figure 4:
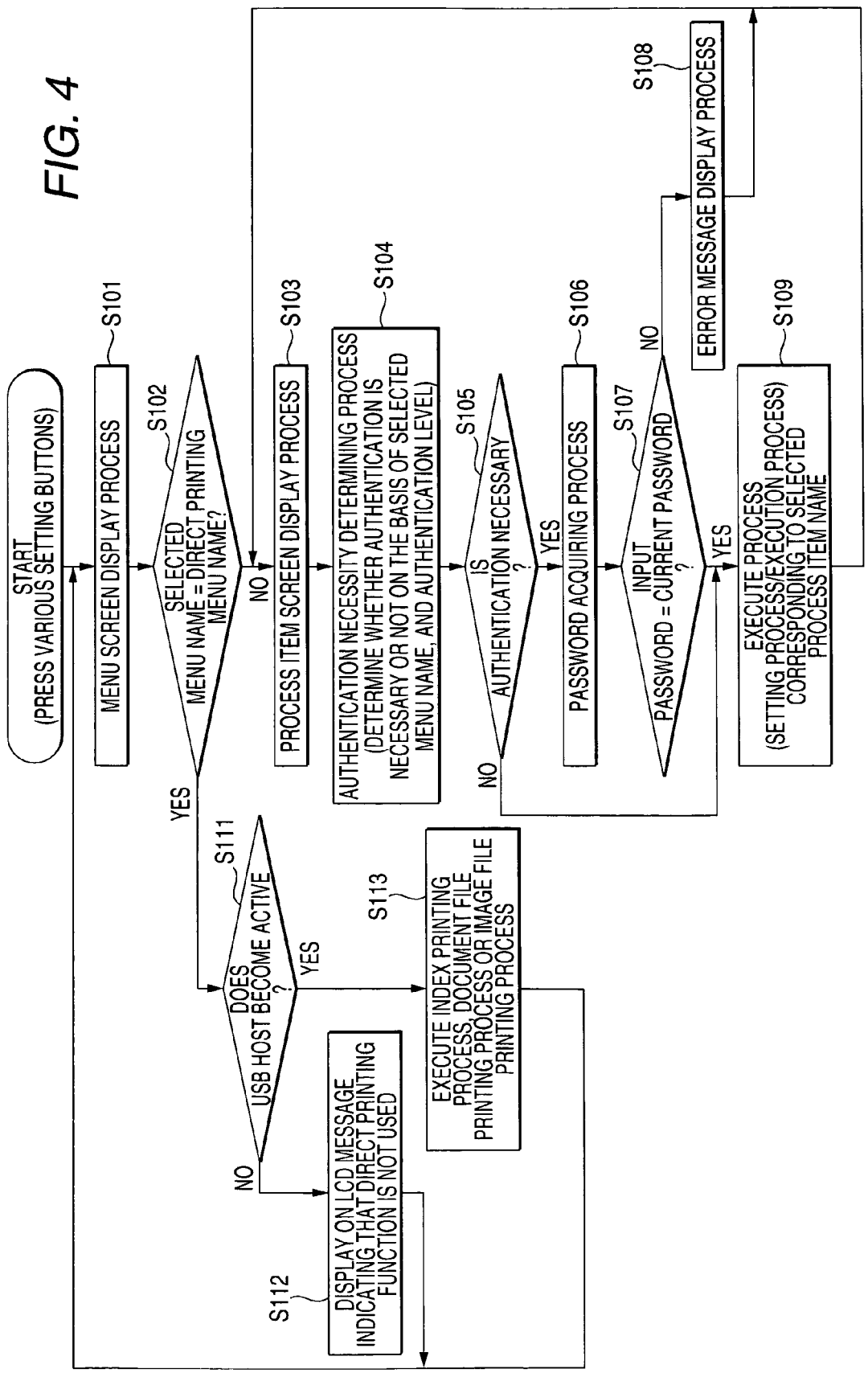
FIG. 4 is a flowchart illustrating various processes executed at the time of pressing various set buttons in a printing apparatus according to an embodiment of the invention.

Furthermore, the firmware is a program that allows the controller 41 having detected that the various setting button 35 is pressed to perform processes according to a sequence shown in FIG. 4. The processes of FIG. 4 are completed after the various setting button 35 is pressed again.

That is, when the various setting button 35 is pressed, first, the controller 41 performs a menu screen display process (Step S101) that displays a menu screen on the LCD 31 on the basis of the menu screen information.

In this case, as schematically shown in FIG. 5, the menu screen information is information (information set in the firmware) that includes a plurality of menu names ('printer information', 'index printing', or the like), and type information in respect to the respective menu names (which will be described in detail below). Further, the menu screens are screens (screens that give menu names of the menu screen information to an operator) in which inversely displayed menu names or four menu names displayed on the screen in the structure shown in FIGS. 6(A) and 6(B) are varied, when the upward button 36U/the downward button 36D is pressed.

When it is detected that the rightward button 36R is pressed, the controller 41 completes a menu screen display process (Step S101 in FIG. 4).

In addition, the controller 41 that has completed the menu screen display process determines whether the menu name selected by the operator (inversely displayed menu name at the time of pressing the rightward button 36R: hereinafter, simply referred to as selected menu name) is a direct printing menu name (any one of 'the index printing', 'the document file printing', and 'the image file printing') (Step S102).

When it is determined that the selected menu name is not the direct printing menu name (Step S102: NO), the controller 41 performs a process item screen display process (Step S103).

The process item screen display process that is executed by the controller 41 at Step S103 is a process that displays a process item screen according to a selected menu name on the LCD 31, and then changes contents of the displayed process item screen according to the instruction by the operator (for example, pressing the upward button 36U/the downward button 36D).

Examples of the process item screen displayed by the process item screen display process may include types shown in FIGS. 7(A1) and 7(A2), a type shown in FIG. 7(B), a type shown in FIG. 7(C), and a type shown in FIG. 7(D). That is, examples of the process item screen may include screens in which process item names ('network I/F=use', 'IP address setting', and 'USB host=use') for starting various setting processes in respect to any interface circuit (for example, processes for changing usage/non-usage information in respect to any interface circuit among operation condition information) are shown (see FIGS. 7(A1) and 7 (A2)), a screen in which process item names for starting various setting processes not being the setting processes in respect to the interface circuit are shown (FIG. 7(B)), a screen in which process item names for starting various execution processes (processes not being the setting processes, such as a reset process or the like) are shown (FIG. 7(C)), and a screen in which process item names for starting various setting processes corresponding to the password (manager password) are shown (FIG. 7(D)). In addition, the type information in the above-described menu screen information (see FIG. 5) becomes information indicating a type of a process item screen displayed at the time of selecting the corresponding menu name.

When it is detected that a rightward button 36R is pressed, the controller 41 completes the process item screen display process (Step 3103 in FIG. 4).

In addition, the controller 41 that has completed the process item screen display process performs an authentication necessity determining process (Step S104). The authentication necessity determining process is a process that determines whether authentication is necessary on the basis of a table shown in FIG. 8, from the type information and the authentication level corresponding to the selected menu name.

The controller 41 that has completed the authentication necessity determining process determines whether the process result obtained by the authentication necessity determining process is 'authentication is necessary' (Step S105). In this case, when it is determined that the process result obtained by the authentication necessity determining process is 'authentication is necessary' (Step S105: YES), the controller 41 performs a password acquiring process (Step S106) so as to obtain a password from an operator (allowing the operator to input the password). More specifically, the controller 41 urges the user to input the password by displaying a window like that shown in FIG. 9 on the process item screen, such that a password acquiring process to obtain the password inputted in a ten-key manner by the operator (in this embodiment, a maximum of 20 characters) is performed (a process which is completed by pressing the rightward button 36R).

The controller 41 that has completed the password acquiring process determines whether the password input by the operator (password obtained by a password acquiring process) matches the password (manager password: hereinafter, referred to as current password) stored in the EEPROM as an element of operation condition information (Step S107).

Figure 10:
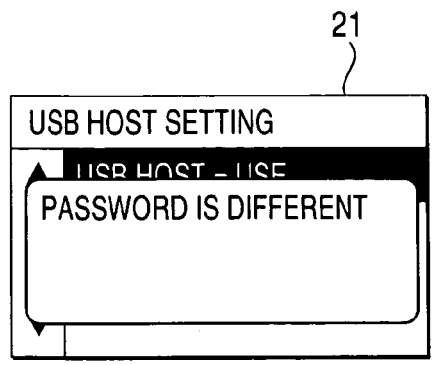
FIG. 10 is a diagram illustrating a state of a LCD in an error message display process.

When it is determined that the password input by the operator is different from the current password (Step S107: NO), the controller 41 performs an error message display process (Step S108) that displays a window shown in FIG. 10 on the process item screen for a predetermined time, and thereafter becomes a state of executing the process of Step S103 (a state of waiting for an operation on the process item screen).

Meanwhile, when it is determined that the password input by the operator matches the current password (Step S107: YES), the controller 41 performs a process corresponding to a selected process item name (inversely displayed process item name at the time of pressing the rightward button 36R) at Step S109, for example, a setting process with respect to the USB host, a setting process of an authentication level, a setting process of a password, a reset process, and the like, and thereafter starts executing a process of Step S103. Further, when it is determined that the process result obtained by the authentication necessity determining process is 'authentication is unnecessary' (Step S105: NO), the controller 41 performs processes after Step S109 without performing the pass acquiring process.

Figure 11:
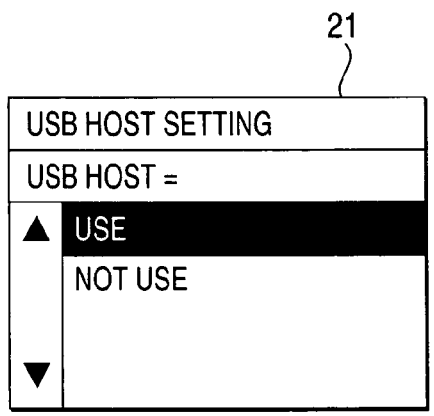
FIG. 11 is a diagram illustrating a screen displayed on an LCD at the time of setting information designating whether a USB host is used or not.
Figure 12:
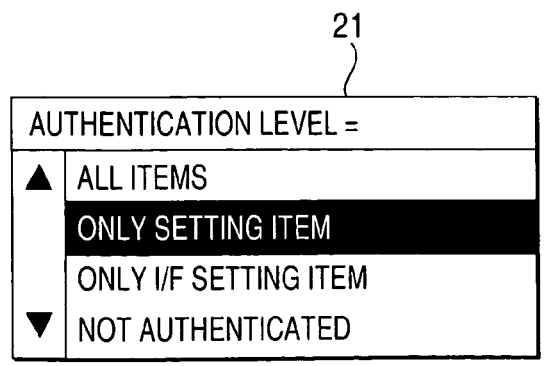
FIG. 12 is a diagram illustrating a screen displayed on a LCD at the time of setting an authentication level.
Figure 13:
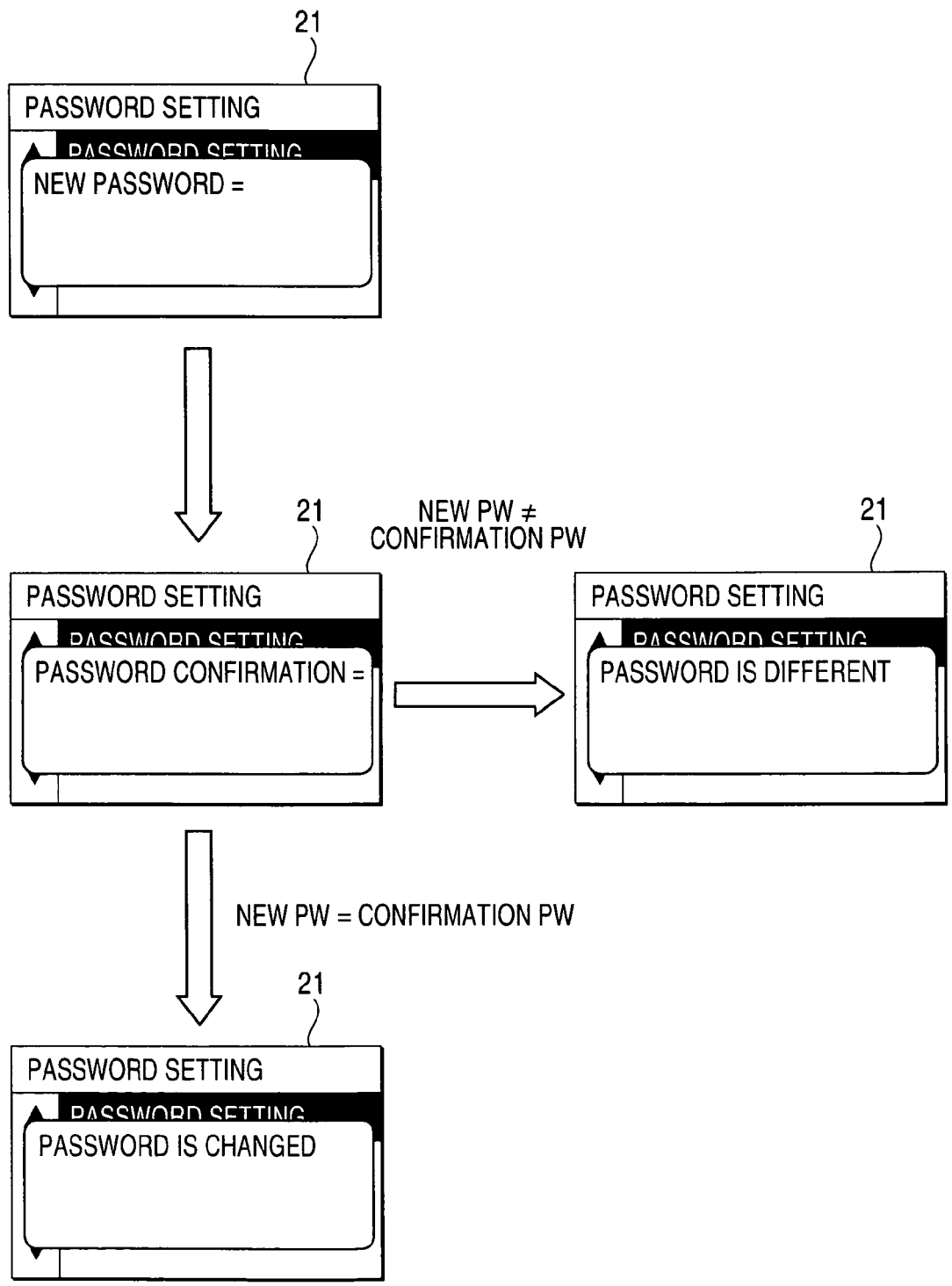
FIG. 13 is a diagram illustrating a screen displayed on a LCD at the time of setting a password.

Further, the setting process with respect to the USB host circuit that is executed by the controller 41 at Step S109 (setting process of USE host usage/non-usage information) becomes a process that displays a screen shown in FIG. 11 on the LCD 31, and the setting process of the authentication level becomes a process that displays the screen shown in FIG. 12 on the LCD 31. Further, as schematically shown in FIG. 13, the setting process of the password becomes a process that makes an operator input a new password twice (process of rewriting a password of the operation condition information, only when the first input password matches the second input password).

Furthermore, when performing a process that changes usage/non-usage information of the operation condition information stored on the EEPROM to 'use', the various setting processes of the usage/non-usage information with respect to the interface circuits that are executed by the controller 41 at Step S109 also perform processes of loading a program for controlling the corresponding interface circuit on the RAM, and when performing a process that changes usage/non-usage information of the operation conditions stored on the EEPROM to 'not use', they perform processes of unloading a program for controlling the corresponding interface circuit from the RAM.

When the selected menu name is the direct printing menu name (Step S102: YES), the controller 41 determines whether the USB host circuit becomes active (where a program for controlling the USB host circuit is loaded on the RAM) (Step S111).

In addition, when it is determined that the USB host circuit becomes active (Step S111: YES), the controller 41 performs an index printing process, a document file printing process or an image file printing process (process corresponding to the selected menu name) at Step S113, and thereafter starts executing a process of Step S101 (state of waiting for an operation on the menu screen). Further, the index printing process means a process that creates a printing material on which an image (so-called thumbnail image) indicating an outline of each file stored in the USB memory inserted into the inserting slot 21 is printed. Further, the document file printing process is a process that gives, to the operator, a file name to each file stored in the USB memory and having an extension that becomes a PDF, and prints a file selected by the operator. The image file printing process is a process that gives, to the operator, a file name to each file stored in the USB memory and having an extension that becomes a BMP, and prints a file selected by the operator.

Meanwhile, when it is determined that the USB host circuit does not become active (Step S111: NO), the controller 41 performs a process (Step S112) that displays a message indicating that the direct printing function (a function of executing an index printing process, a document file printing process or an image file printing process) cannot be used on the LCD 31 for a predetermined time, and thereafter starts executing a process of Step S101.

As can be understood from the above-described description, the printing apparatus 10 according to the present embodiment can operate in an operation mode in which a direct printing function can be used (an operation mode in which the USB host circuit usage/non-usage information is set to 'use'), and an operation mode in which the direct printing function cannot be used (an operation mode in which the USB host circuit usage/non-usage information is set to 'not use'). Further, the printing apparatus 10 can change an operation mode relating to the direct printing function by people who only know the manager password. Accordingly, in the printing apparatus 10, even though it has the direct printing function, it can be used in an environment where charging for printing is made, or an environment where printing is restricted for security reasons.

Further, when the USB host circuit usage/non-usage information is set to 'not used', the printing apparatus 10 operates in a state where a program for controlling the USB host circuit is not loaded on the RAM. Accordingly, the following problem does not occur in the printing apparatus 10. In a case where the printing apparatus 10 adopts a structure in which the program for controlling the USB host circuit is always loaded on the RAM, even when the direct printing function is not used, memory regions of the RAM are insufficiently used.

(Modification)

Various modifications can be made with respect to the above-described printing apparatus 10. For example, in the above-described embodiment, the printing apparatus 10 can operate as a copy machine, but the printing apparatus 10 can be modified to have a function as a printer and a direct printing function.

Further, the printing apparatus 10 may be modified to an apparatus that displays a screen having a structure different from the above-described structure, or an apparatus different from the above-described apparatus in the hardware configuration (for example, apparatus that includes not only the USB host circuit but also an interface circuit for a memory card).

What is claimed is:

1. A printing apparatus comprising:
    a recording medium interface that accesses information from a recording medium;
    a printer that performs printing;
    a non-volatile storage that stores a password, and usage/non-usage designating information indicating whether or not the recording medium interface is used;
    a usage/non-usage information changing portion that executes a process for changing the usage/non-usage information stored in the non-volatile storage according to an instruction by an operator, only when the operator inputs the password stored in the non-volatile storage; and
    a controller that executes a direct printing process for reading out the information from the recording medium and allowing contents indicated by the information to be printed by the printer,
    wherein, when the usage/non-usage information stored in the non-volatile storage is information indicating that the recording medium interface is not used, the controller operates in a state where the controller does not execute a process that access the recording medium interface at all.

2. The printing apparatus according to claim 1, wherein the controller includes a CPU, a RAM and a ROM, and
    the ROM stores an interface control program for controlling the recording medium interface, and a main program that allows the CPU that starts to operate according to its program to load the interface control program on the RAM when the usage/non-usage designating information stored in the non-volatile storage is information indicating that the recording medium interface is used.

3. The printing apparatus according to claim 1, wherein the recording medium interface is a USB host.

* * * * *